United States Patent
Idei

(10) Patent No.: US 9,622,201 B2
(45) Date of Patent: Apr. 11, 2017

(54) SYNCHRONIZATION OF CONTROL DEVICE

(71) Applicant: FANUC Corporation, Minamitsuru-gun, Yamanashi (JP)

(72) Inventor: Takashi Idei, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 0 days.

(21) Appl. No.: 14/748,449

(22) Filed: Jun. 24, 2015

(65) Prior Publication Data
US 2015/0378326 A1    Dec. 31, 2015

(30) Foreign Application Priority Data

Jun. 25, 2014 (JP) ................. 2014-130043

(51) Int. Cl.
G05B 13/02 (2006.01)
H04W 56/00 (2009.01)
G05B 17/00 (2006.01)
G05B 19/416 (2006.01)

(52) U.S. Cl.
CPC .......... H04W 56/00 (2013.01); G05B 17/00 (2013.01); G05B 19/416 (2013.01); G05B 2219/37436 (2013.01); G05B 2219/50218 (2013.01)

(58) Field of Classification Search
CPC ...... G05B 13/026; G05B 17/00; H04W 56/00
See application file for complete search history.

(56) References Cited

U.S. PATENT DOCUMENTS

| | | | | | |
|---|---|---|---|---|---|
| 4,267,458 A | * | 5/1981 | Uram | ...................... | F01D 17/24 290/40 R |
| 5,202,611 A | * | 4/1993 | Uehara | ................ | G05B 19/416 318/112 |
| 5,252,900 A | * | 10/1993 | Uehara | .................. | G05B 19/41 318/49 |
| 5,307,549 A | * | 5/1994 | Tsutsumi | ............. | G05B 19/186 29/27 C |
| 5,434,486 A | * | 7/1995 | Tanaka | ...................... | H02P 5/56 318/69 |

(Continued)

FOREIGN PATENT DOCUMENTS

| JP | 2002-202818 A | 7/2002 |
|---|---|---|
| JP | 2012-194665 A | 10/2012 |
| JP | 2013-011937 A | 1/2013 |

OTHER PUBLICATIONS

Notification of Reasons for Refusal issued Oct. 27, 2015 in Japanese Patent Application No. 2014-130043 (2 pages) with an English translation (4 pages).

*Primary Examiner* — Ramesh Patel

(74) *Attorney, Agent, or Firm* — Drinker Biddle & Reath LLP

(57) ABSTRACT

A synchronization control device includes a command movement amount calculation unit, a predicted command movement amount calculation unit, and a movement amount comparison unit for comparing a command movement amount with a predicted command movement amount, and synchronization of a driven shaft is not started when the predicted command movement amount is less than the command movement amount, and synchronization is started when the predicted command movement amount is equal to or greater than the command movement amount.

14 Claims, 8 Drawing Sheets

(56) References Cited

U.S. PATENT DOCUMENTS

| | | | | |
|---|---|---|---|---|
| 5,477,117 | A * | 12/1995 | Saito | B23Q 7/007 198/460.1 |
| 6,725,281 | B1 * | 4/2004 | Zintel | H04L 12/2803 709/217 |
| 7,620,478 | B2 * | 11/2009 | Fortell | B25J 9/1682 318/568.11 |
| 8,305,016 | B2 * | 11/2012 | Okita | G05B 19/404 318/34 |
| 9,136,781 | B2 * | 9/2015 | Okita | H02P 5/526 |
| 2002/0103567 | A1 * | 8/2002 | Hishikawa | G05B 19/416 700/170 |
| 2003/0090230 | A1 * | 5/2003 | Fujibayashi | G05B 19/19 318/625 |
| 2005/0096180 | A1 * | 5/2005 | Wadas | B60W 10/06 477/107 |
| 2006/0125438 | A1 * | 6/2006 | Fujibayashi | G05B 19/4142 318/575 |
| 2007/0145931 | A1 * | 6/2007 | Onishi | B22D 17/32 318/569 |
| 2009/0009126 | A1 * | 1/2009 | Hishikawa | G05B 19/416 318/600 |
| 2013/0002185 | A1 * | 1/2013 | Hosomi | G05B 19/416 318/625 |
| 2014/0088767 | A1 * | 3/2014 | Shimamura | G05B 19/056 700/275 |

* cited by examiner

SYNCHRONIZATION OF CONTROL DEVICE

RELATED APPLICATION DATA

This application claims priority under 35 U.S.C. §119 and/or §365 to Japanese Application No. 2014-130043 filed Jun. 25, 2014, the entire contents is incorporated herein by reference.

BACKGROUND OF THE INVENTION

1. Field of the Invention

The present invention relates to a synchronization control device, and more particularly, to a synchronization control device which is used in the control of machines having operating parts, such as machine tools, industrial machinery, robots, and the like.

2. Description of the Related Art

In the control of machines having operating parts, such as machine tools, industrial machinery, robots, and the like, there are cases where a plurality of operating members are controlled in a synchronized fashion. In synchronization control of this kind, a method of synchronization control is known in which the plurality of operating members are divided between a drive side and a driven side, and the positional control of members on the driven side is made to correspond to the position data of the members on the drive side. Synchronization control of this kind frequently uses electronic cams, the driven-side members being provided with a drive mechanism, such as a servo motor, and the position of the drive mechanism being controlled in accordance with position data for the drive-side member. With this synchronization control, the driven-side members operate in synchronism with the drive-side members.

FIG. 8 is a general schematic drawing for illustrating synchronization control according to the prior art. In FIG. 8, the driven side 2 is driven by a servo motor 4 on the basis of a movement command from a control device 6. The control device 6 internally stores a positional relationship between members on the drive side 1 and the driven side 2 when the members are operating in synchronism in a displacement table $T_D$, determines the positional data of the position of the member on the driven side 2, which corresponds to the position of the member on the drive side 1, at prescribed intervals apart, from the positional relationship stored in the displacement table $T_D$, sends a movement command to a member driving servo motor 4 on the driven side 2, on the basis of this positional relationship, and thereby controls the position of the member on the driven side 2. Thus, it is possible to achieve synchronization between the drive side 1 and the driven side 2.

FIG. 9 is a diagram showing a state of synchronization of a driven shaft in a synchronization control device according to the prior art. The vertical axis represents the displacement $P_A$ of the driven shaft, and the horizontal axis represents the phase $P_H$ of the drive shaft. The curve in FIG. 9 illustrates the displacement table $T_D$ which indicates the relationship between the phase of the drive shaft and the displacement of the driven shaft, for each phase of the drive shaft. $P_W$ indicates a driven shaft standby position, and the driven shaft waits at standby at this position before synchronization. Furthermore, $D_A$ indicates a permitted movement amount, which indicates a range in which synchronization is possible from the driven shaft standby position $P_W$. In a synchronization control device set up in this way, when the driven shaft, which is stopped at the driven shaft standby position $P_W$, is synchronized with the drive shaft at an intermediate stage, then synchronization is started when the amount of movement of the driven shaft has reached the permitted movement amount $D_A$, and synchronization is performed on the basis of the displacement table $T_D$.

Japanese Patent Application Publication No. 2002-202818 discloses technology wherein, when driving of a driven side member is started and synchronized with the operation of a drive side member, movement of the driven side member is started before a synchronization start position for starting synchronized operation, the drive side member and the driven side member are synchronized at the synchronization start position by acceleration/deceleration control, and positional control is performed on the basis of a displacement table, from synchronization start phase on.

FIG. 10 is a diagram showing a state of synchronization of a driven shaft in the synchronization control device disclosed in Japanese Patent Application Publication No. 2002-202818. Parts of the configuration which are similar to FIG. 9 are labelled with the same reference numerals and description thereof is omitted here. In FIG. 10, movement of the driven shaft is started at a movement start phase $P_{HS1}$ before the synchronization start phase $P_{HS2}$, acceleration/deceleration control is performed during the time period from the movement start phase $P_{HS1}$ to the synchronization start phase $P_{HS2}$, and synchronization is performed in the synchronization start phase $P_{HS2}$.

In the synchronization method described in the prior art, synchronization is started when the amount of movement of the driven shaft has become equal to or less than the permitted movement amount $D_A$. On the other hand, since the movement of the drive shaft is read out on the basis of a monitoring period, then when the drive shaft moves at high speed, there is a risk that the amount of movement of the driven shaft may not be within the permitted movement amount $D_A$ at the time that it is monitored, and that synchronization may not be possible. One method for avoiding this would be to set the permitted movement amount $D_A$ to a large value in accordance with the highest speed of the drive shaft, but if the permitted movement amount $D_A$ is set to a large value, then the amount of movement of the driven shaft during synchronization also become large, accordingly, and hence there is a risk of causing large shocks to the machinery during synchronization.

Furthermore, in the technology disclosed in Japanese Patent Application Publication No. 2002-202818 and illustrated in FIG. 10, during the time period in which acceleration/deceleration control is performed from the movement start phase $P_{HS1}$ to the synchronization start phase $P_{HS2}$, the driven shaft performs movements that are different to those based on the displacement table $T_D$, and hence there is a risk of interference with other driven shafts.

SUMMARY OF THE INVENTION

Therefore, it is an object of the present invention to provide a synchronization control device whereby, in synchronization control for determining the displacement of a driven shaft, and positioning the driven shaft, with respect to the phase of a drive shaft, synchronization of the driven shaft can be performed reliably, while reducing shocks during synchronization, without interference with other driven shafts.

The synchronization control device according to the present invention is a synchronization control device configured to previously register a displacement table, in which displacement of a driven shaft is associated with respective phases of a drive shaft, and determine a displacement of the driven shaft with respect to the phase of the drive shaft and position the driven shaft on the basis of the displacement table, this synchronization control device including: a command movement amount calculation unit for calculating a command movement amount, which is an amount of movement of the driven shaft to a synchronization position, relative to a current phase of the drive shaft, on the basis of the displacement table;

a predicted command movement amount calculation unit for calculating a predicted command movement amount, which is an amount of movement of the driven shaft to a synchronization position, relative to the phase of the drive shaft after the current phase, on the basis of the displacement table; and a movement amount comparison unit for comparing the command movement amount with the predicted command movement amount, wherein synchronization of the driven shaft is not started when the comparison result from the movement amount comparison unit indicates that the predicted command movement amount is less than the command movement amount, and synchronization is started when the predicted command movement amount is equal to or greater than the command movement amount.

According to the configuration described above, since a command movement amount which is the amount of movement to the synchronization position of the driven shaft in the current phase of the drive shaft is compared with the predicted command movement amount which is the amount of movement to the synchronization position of the driven shaft in the phase of the drive shaft after the current phase, and synchronization is started when the predicted command movement amount is equal to or greater than the command movement amount, then it is possible to start synchronization when the amount of movement is smallest, and therefore synchronization of the driven shaft can be performed reliably while reducing shocks during synchronization, and interference with other driven shafts is also avoided.

A permitted movement amount may be set and synchronization may be started when the command movement amount is equal to or less than the permitted movement amount and when the predicted command movement amount is equal to or greater than the command movement amount.

Since a permitted movement amount, which is the maximum amount of movement to the synchronization position of the driven shaft, is set, and synchronization is performed when the command movement amount is equal to or less than the permitted movement amount, then even in cases where the range of displacement of the driven shaft varies greatly, it is possible to perform synchronization only when the amount of movement is equal to or less than the set permitted movement amount, and therefore synchronization involving an excessively large amount of movement can be prevented.

A configuration may be adopted wherein the predicted command movement amount calculated by the predicted command movement amount calculation unit is configured to be selected from any one of a predicted command movement amount in a next computation period, a predicted command movement amount in each of a plurality of subsequent computation periods from the next period on, and a predicted command movement amount in each of a plurality of subsequent computation periods during the time of one revolution of the drive shaft, from the next period; and the movement amount comparison unit is configured to compare the selected predicted command movement amount and the command movement amount, and starts synchronization when the command movement amount is smallest.

Since, as the predicted command movement amount, one of a single predicted command movement amount in the next computation period, a predicted command movement amount in a plurality of subsequent computation periods from the next period on, and a predicted command movement amount in a plurality of subsequent computation periods during one revolution of the drive shaft, can be selected, and synchronization is started when the command movement amount is smallest among these, then even in the case of a displacement table in which there is variable increase and decrease depending on the selection circumstances, because a comparison is made with the prediction command movement amount in a plurality of subsequent computation periods after the current period, and synchronization is started when the command movement amount is smallest, then it is possible to calculate the point at which the amount of movement of the driven shaft is smallest, more accurately.

A synchronization operation may be started when the direction of movement based on the command movement amount calculated by the command movement amount calculation unit and the direction of movement based on the predicted command movement amount calculated by the predicted command movement amount calculation unit are the same, and the predicted command movement amount is equal to or greater than the command movement amount.

Since synchronization is not performed when the direction of movement based on the command movement amount and the direction of movement based on the predicted command movement amount are different, and synchronization is performed when these directions are the same, then it is possible to perform synchronization when the direction of movement is stable, and therefore to achieve a more stable synchronization operation.

The synchronization control device according to the present invention is a synchronization control device is configured to previously register a displacement table, in which displacement of a driven shaft is associated with respective phases of a drive shaft, and determine a displacement of the driven shaft with respect to the phase of the drive shaft and position the driven shaft on the basis of the displacement table, this synchronization control device including: a command speed calculation unit for calculating a command speed, which is a speed of movement of the driven shaft to a synchronization position, relative to the current phase of the drive shaft, on the basis of the displacement table; a predicted command speed calculation unit for calculating a predicted command speed, which is a speed of movement of the driven shaft to a synchronization position, relative to the phase of the drive shaft after the current phase, on the basis of the displacement table; and a speed comparison unit for comparing the command speed with the predicted command speed, wherein synchronization of the driven shaft is not started when the comparison result from the speed comparison unit indicates that the predicted command speed is less than the command speed, and synchronization is started when the predicted command speed is equal to or greater than the command speed.

According to the configuration described above, since a command speed which is the speed of movement to the synchronization position of the driven shaft in the current phase of the drive shaft is compared with the predicted command speed which is the speed of movement to the synchronization position of the driven shaft in the phase of the drive shaft after the current phase, and synchronization is started when the predicted command speed is equal to or greater than the command speed, then it is possible to start synchronization when the speed of movement is smallest, and therefore synchronization of the driven shaft can be performed reliably while reducing shocks during synchronization, and interference with other driven shafts is also avoided.

A permitted movement speed may be set and synchronization may be started when the command speed is equal to or lower than the permitted movement speed and the predicted command speed is equal to or greater than the command speed.

Since a permitted movement speed, which is the maximum speed of movement to the synchronization position of the driven shaft, is set, and synchronization is performed when the command speed is equal to or lower than the permitted movement speed, then even in cases where the range of displacement of the driven shaft varies greatly and where movement speed during synchronization becomes greater, it is possible to perform synchronization only when the speed of movement is equal to or lower than the set permitted movement speed, and therefore synchronization involving an excessively large speed of movement can be prevented.

A configuration may be adopted, wherein the predicted command speed calculated by the predicted command speed calculation unit is configured to be selected from any one of a predicted command speed in a next computation period, a predicted command speed in each of a plurality of subsequent computation periods from the next period on, and a predicted command speed in each of a plurality of subsequent computation periods during the time of one revolution of the drive shaft, from the next period; and the speed comparison unit compares the selected predicted command speed and the command speed, and starts synchronization when the command speed is smallest.

Since, as the predicted command speed, one of a single predicted command speed in a next computation period, a predicted command speed in a plurality of subsequent computation periods from the next period on, and a predicted command speed in a plurality of subsequent computation periods during one revolution of the drive shaft, can be selected, and synchronization is started when the command speed is smallest among these, then even in the case of a displacement table in which there is variable increase and decrease depending on the selection circumstances, because a comparison is made with the prediction command speed in a plurality of subsequent computation periods after the current period, and synchronization is started when the command speed is smallest, then it is possible to calculate the point at which the speed of movement of the driven shaft is smallest, more accurately.

A synchronization operation may be started when the direction of movement based on the command speed calculated by the command speed calculation unit and the direction of movement based on the predicted command speed calculated by the predicted command speed calculation unit are the same, and the predicted command speed is equal to or greater than the command speed.

Since synchronization is not performed when the direction of movement based on the command speed and the direction of movement based on the predicted command speed are different, and synchronization is performed when these directions are the same, then it is possible to perform synchronization when the direction of movement is stable, and therefore to achieve a more stable synchronization operation.

By adopting the configuration described above, the present invention is able to provide a synchronization control device whereby, in synchronization control for determining the displacement of a driven shaft, and positioning the driven shaft, with respect to the phase of a drive shaft, synchronization of the driven shaft can be performed reliably, while reducing shocks during synchronization, and without interference with other driven shafts.

BRIEF DESCRIPTION OF THE DRAWINGS

The abovementioned and further objects and characteristic features of the present invention will become evident from the following description of the embodiments with reference to the drawings, in which.

DETAILED DESCRIPTION OF THE PREFERRED EMBODIMENTS

Figure 1:
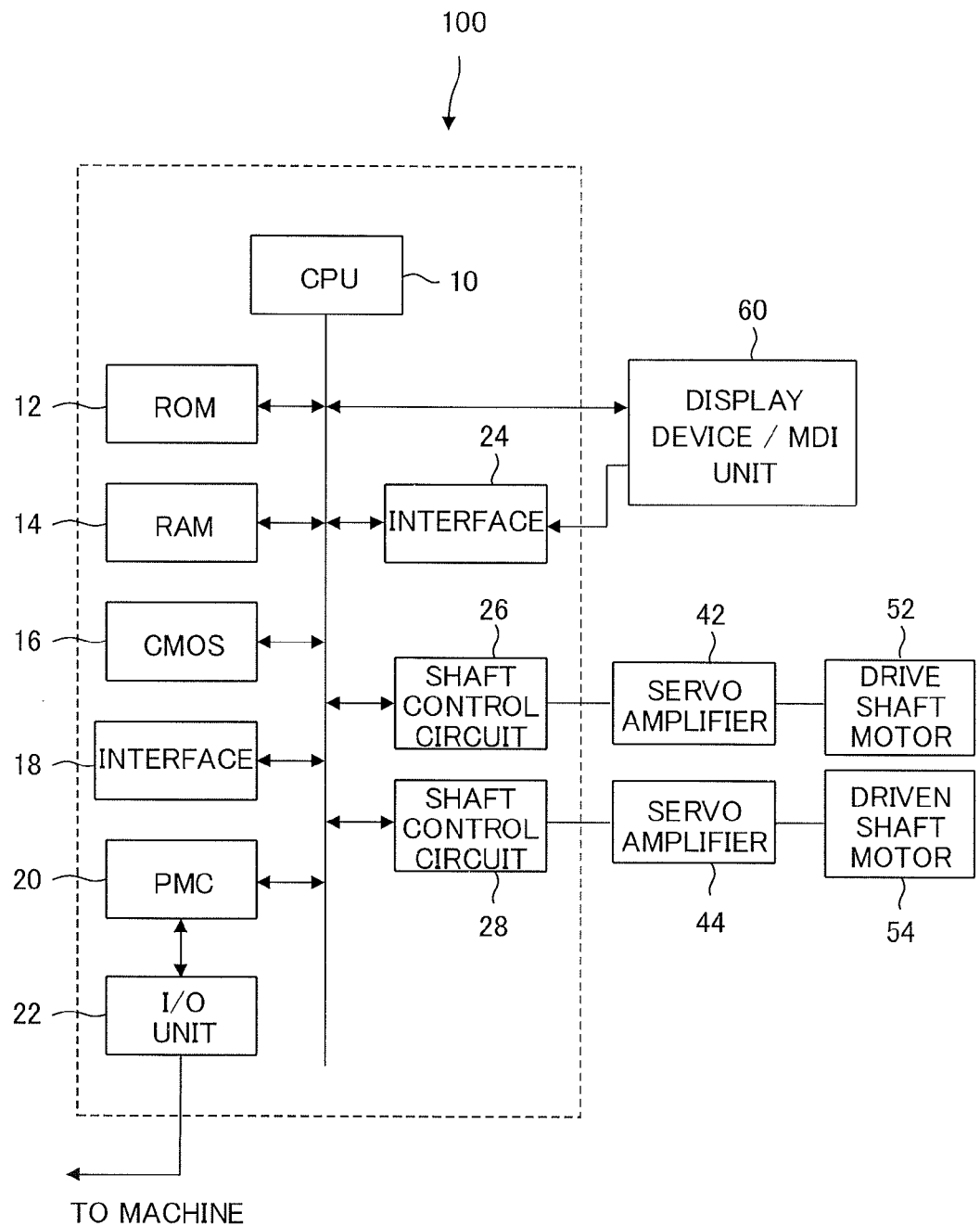
FIG. 1 is a block diagram of a numerical control device to which the synchronization control device according to several embodiments of the present invention is applied.

FIG. 1 is a block diagram of a numerical control device to which the synchronization control device according to several embodiments of the present invention is applied. 100 is a numerical control device, which contains a CPU 10, a ROM 12, a RAM 14, a CMOS 16, an interface 18, a PMC 20, an I/O unit 22, an interface 24, and shaft control circuits (26, 28), with each of these being connected to a bus. The CPU 10 is a processor which implements overall control of the numerical control device 100. The CPU 10 reads out a system program stored in a ROM 12, via the bus, and controls the whole of the numerical control device 100 in accordance with this system program. Temporary calculation data, display data and various data input by the operator via the display device/MDI unit 60 are stored in the RAM 14.

The CMOS 16 is backed up by a battery (not illustrated), and is composed as a non-volatile memory in which the storage state is maintained, even if the power supply to the numerical control device 100 is turned off. A processing program (NC program) which is read out via the interface 18 and a processing program input via the display device/MDI unit 60, and the like, are stored in the CMOS 16. Furthermore, various system programs for implementing editing mode processing, which is necessary for creating and editing processing programs, and processing for automatic operation, are written previously to the ROM 12.

The displacement table which is used to implement the present invention can be input via the interface 18 or CRT/MDI unit 60, and stored in the CMOS 16. The concrete contents of the displacement table are described below.

The programmable machine controller (PMC) 20 implements control by outputting signals via the I/O unit 22 to auxiliary equipment of a machine tool (for example, actuators such as robot hands for changing tools), in accordance with a sequence program which is installed in the numerical control device 100. Furthermore, the PMC 20 also receives signals from various switches, and the like, of an operating panel which is provided on the main body of the machine tool, applies necessary signal processing to the signals, and then transfers the signals to the CPU 10.

The display device/MDI unit 60 is a manual data input device provided with a display monitor and a keyboard, etc., and the interface 24 receives commands and data from the keyboard of the display device/MDI unit and transfers same to the CPU.

The shaft control circuits (26, 28) for each shaft receive the movement command amounts for each shaft from the CPU 10, and output the commands for each shaft to servo amplifiers. Upon receiving these commands, the servo amplifiers (42, 44) drive a drive shaft motor 52 and a driven shaft motor 54. The drive shaft motor 52 and driven shaft motor 54 are each provided internally with position and speed detectors (not illustrated), and position and speed feedback signals from these position and speed detectors are fed back to the shaft control circuits (26, 28) in order to perform feedback control of the position and speed. The position/speed feedback is not depicted in the block diagram.

First Embodiment

Below, an embodiment of the present invention is described on the basis of the drawings, in relation to the displacement table illustrated in FIG. 1 and the synchronization method for the driven shaft.

Figure 2:
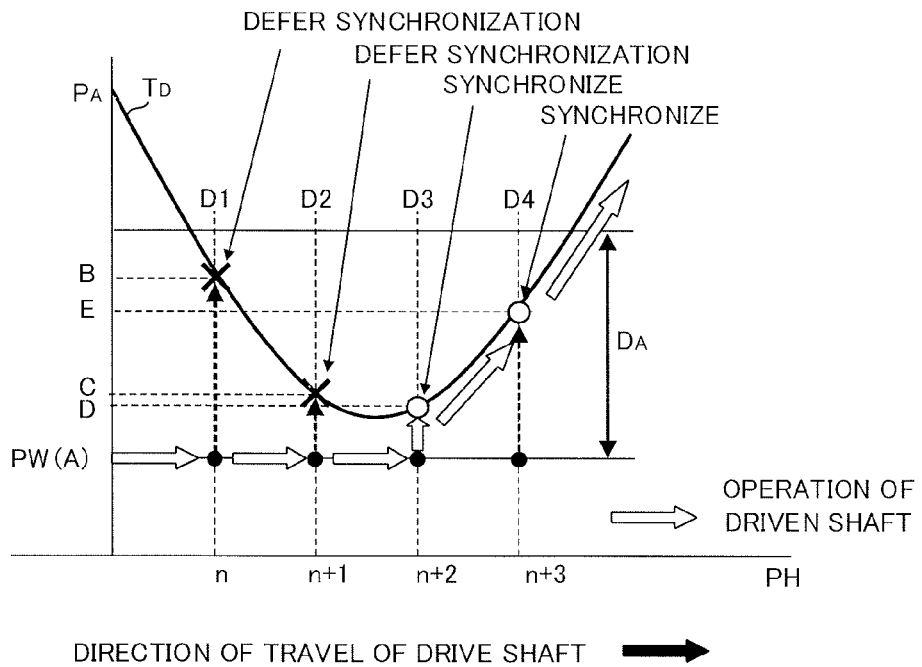
FIG. 2 is a diagram showing a state of synchronization of a driven shaft in a first embodiment.
Figure 9:
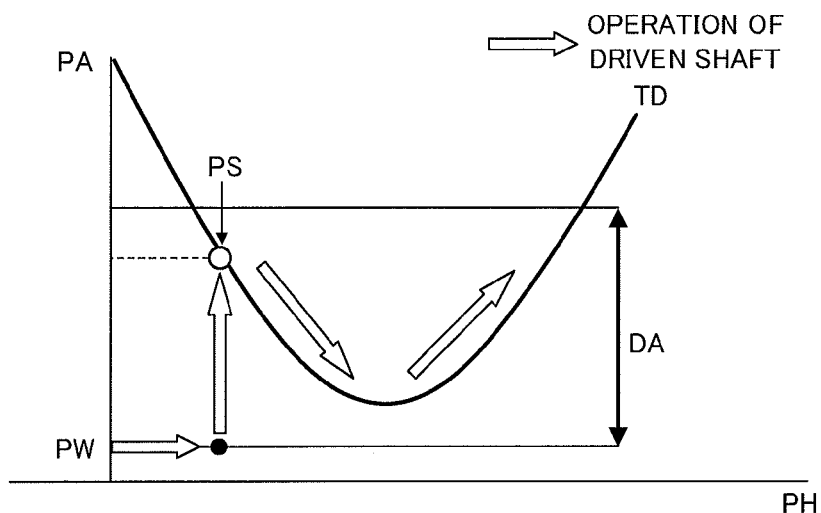
FIG. 9 is a diagram showing a state of synchronization of a driven shaft in the synchronization control device according to the prior art.
Figure 10:
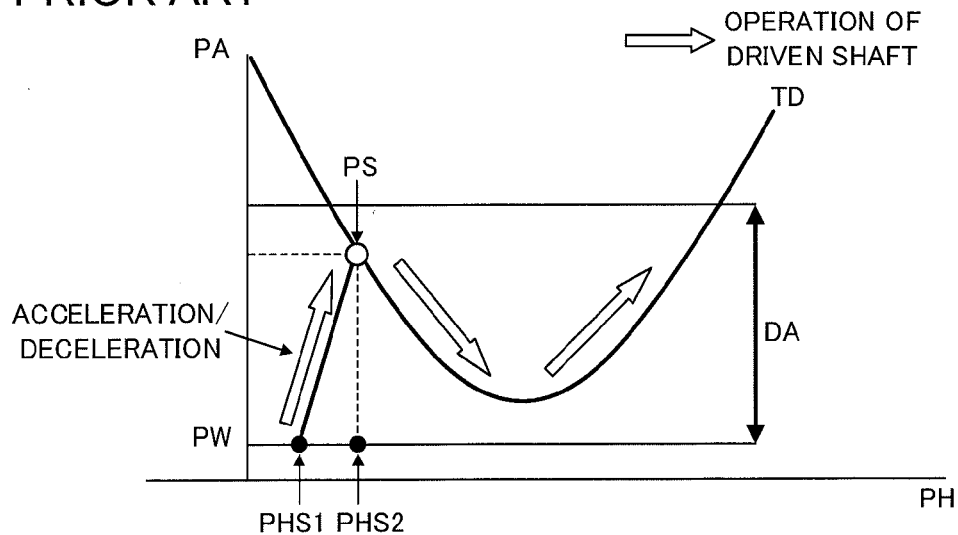
FIG. 10 is a diagram showing a state of synchronization of a driven shaft in the synchronization control device according to the prior art.

FIG. 2 is a diagram showing a state of synchronization of a driven shaft in the synchronization control device according to the present embodiment. Parts of the configuration which are similar to FIG. 9 are labelled with the same reference numerals and description thereof is omitted here. In the present embodiment, the drive shaft moves in the same direction at a uniform speed. D1 to D4 are partitions of the control device (partition 1 to partition 4), and the differential with respect to the driven shaft which is waiting at the standby position $P_W$, in each of partition 1 (D1), partition 2 (D2), partition 3 (D3) and partition 4 (D4) is assumed to be equal to or less than the permitted movement amount $D_A$. In this case, the phase of the drive shaft in partition 1 (D1), partition 2 (D2), partition 3 (D3) and partition 4 (D4) is respectively called n, n+1, n+2, n+3, and the displacement of the driven shaft based on the displacement table at each of the phases is respectively called B, C, D and E.

The values of the displacement of the driven shaft in each of the phases are compared. When the current phase of the drive shaft is n (partition 1 (D1)), then the amount of movement for synchronizing the driven shaft, which is waiting at the standby position $P_W$, with the drive shaft, is (B−A). Next, a predicted movement amount is predicted in the phases of the drive shaft from the current phase of the drive shaft on. In the present embodiment, when the current phase of the drive shaft is n (partition 1 (D1)), then the amount of movement for synchronizing the driven shaft with the drive shaft, in the phase n+1 of the drive shaft in the next partition 2 (D2), is predicted. The amount of movement in partition 2 (D2) according to the present embodiment is (C−A). Here, when the amounts of movement B−A and C−A are compared, the amount of movement C−A is shorter, and therefore, synchronization of the driven shaft is deferred in partition 1 (D1), and the driven shaft keeps a standby state.

Next, the situation when the phase of the drive shaft becomes n+1 (partition 2 (D2)) is considered. In this case, the amount of movement for synchronizing the driven shaft which is waiting at the standby position $P_W$, with the drive shaft, is (C−A). The amount of movement for synchronizing the driven shaft with the drive shaft in the next phase n+2 of the drive shaft in partition 3 (D3) is predicted. The amount of movement in partition 3 (D3) according to the present embodiment is (D−A). Here, when the amounts of movement C−A and D−A are compared, the amount of movement D−A is shorter, and therefore, synchronization of the driven shaft is deferred in partition 2 (D2), and the driven shaft keeps a standby state.

Next, the situation when the phase of the drive shaft becomes n+2 (partition 3 (D3)) is considered. In this case, the amount of movement for synchronizing the driven shaft which is waiting at the standby position $P_W$, with the drive shaft, is (D−A). Thereupon, the amount of movement for synchronizing the driven shaft with the drive shaft in the phase n+3 of the drive shaft in the next partition 4 (D4) is predicted. The amount of movement in partition 4 (D4) according to the present embodiment is (E−A). Here, when the amounts of movement D−A and E−A are compared, the amount of movement E−A is longer, and therefore, positioning of the driven shaft and synchronization with the drive shaft is performed in partition 3 (D3).

In partition 4 (D4), since the driven shaft has been synchronized with the drive shaft in partition 3 (D3), then the synchronization is continued and the driven shaft is positioned towards displacement E.

In other words, the amount of movement of the cam in each partition is (B−A)>(C−A)>(D−A)≤(E−A), and therefore synchronization is started in partition 3.

In this way, the synchronization position of the driven shaft is determined, and an actual synchronization operation is carried out, on the basis of the displacement table.

Figure 3:
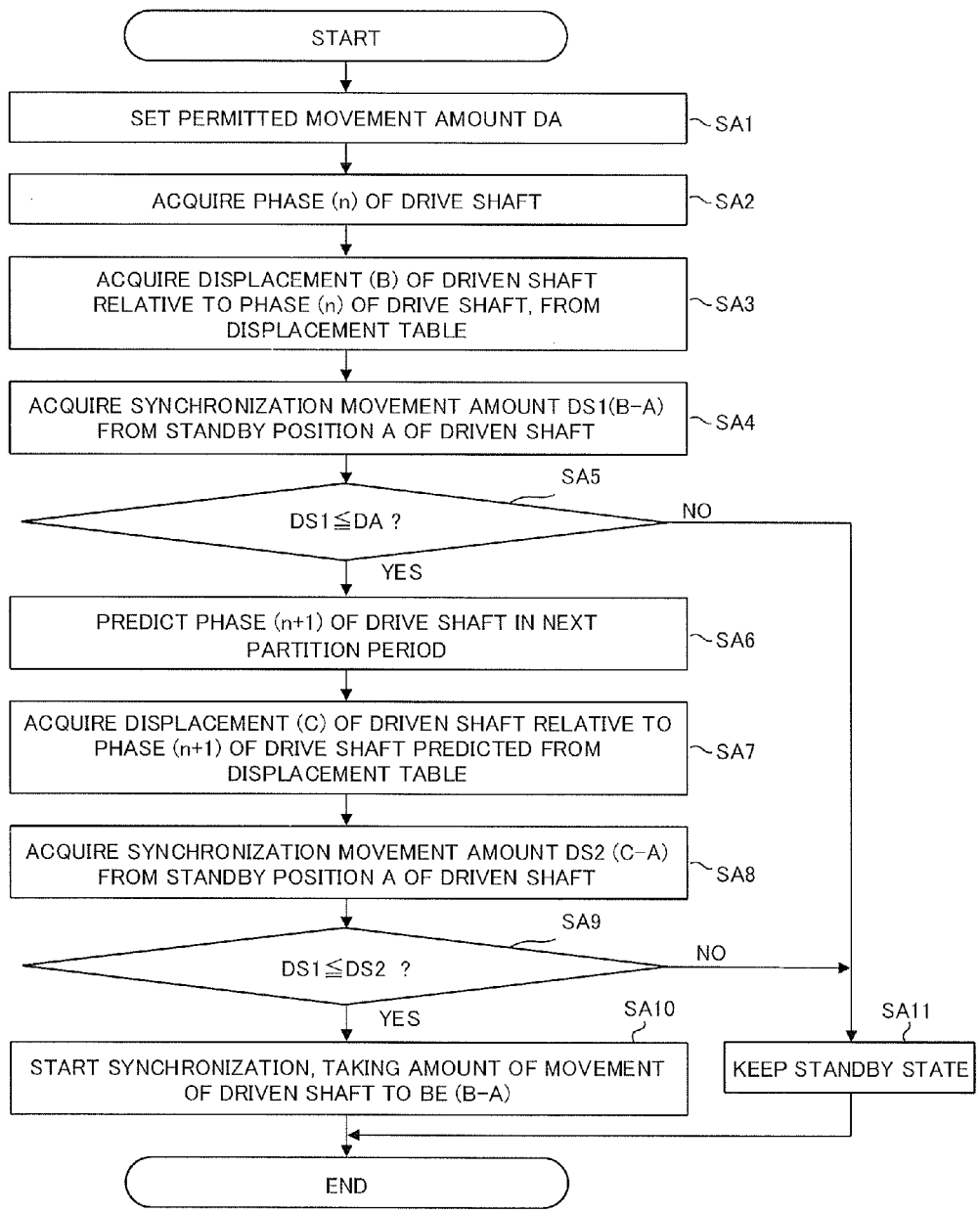
FIG. 3 is a flowchart showing a flow of the determination of the synchronization position of the driven shaft, and the synchronization operation, according to the first embodiment.

FIG. 3 is a flowchart showing a flow of the determination of the synchronization position of the driven shaft, and the synchronization operation, according to the present embodiment. This flow is described below, step by step.

(Step SA1) The permitted movement amount $D_A$ of the driven shaft is set.

(Step SA2) The phase (n) of the drive shaft at the current position of the drive shaft is acquired.

(Step SA3) The displacement (B) of the driven shaft relative to the phase (n) of the drive shaft is acquired on the basis of the displacement table.

(Step SA4) The synchronization movement amount $C_{S1}$ (B−A) from the standby position A of the driven shaft is acquired.

(Step SA5) It is determined whether or not the synchronization movement amount $D_{S1}$ is equal to or less than the permitted movement amount $D_A$.

If the synchronization movement amount $D_{S1}$ is equal to or less than the permitted movement amount $D_A$ (YES), then the procedure advances to step SA6, whereas if the synchronization movement amount $D_{S1}$ is greater than the permitted movement amount $D_A$ (NO), then the procedure advances to step SA11.

(Step SA6) The phase (n+1) of the drive shaft in the next partition period is predicted.

(Step SA7) The displacement (C) of the driven shaft relative to the phase (n+1) of the drive shaft is acquired on the basis of the displacement table.

(Step SA8) The synchronization movement amount $D_{S2}$ (C−A) from the standby position A of the driven shaft is acquired.

(Step SA9) It is determined whether or not the synchronization movement amount $D_{S1}$ is equal to or less than the synchronization movement amount $D_{S2}$.

If the synchronization movement amount $D_{S1}$ is equal to or less than the synchronization movement amount $D_{S2}$ (YES), then the procedure advances to step SA10, whereas if the synchronization movement amount $D_{S1}$ is greater than the synchronization movement amount $D_{S2}$ (NO), then the procedure advances to step SA11.

(Step SA10) Synchronization is started taking the amount of movement of the driven shaft to be (B−A).

(Step SA11) The standby state is kept.

In the present embodiment, before comparing the synchronization movement amount $D_{S1}$ of the driven shaft at the current position of the drive shaft with the synchronization movement amount $D_{S2}$ in the next partition period, the synchronization movement amount $D_{S1}$ is compared with the permitted movement amount $D_A$, but in cases where the driven shaft does not perform considerable displacement, for instance, the comparison of the synchronization movement amount $D_{S1}$ and the permitted movement amount $D_A$ is omitted, and the synchronization start position of the driven shaft can be determined simply by comparing the synchronization movement amount $D_{S1}$ of the driven shaft at the current position of the drive shaft with the synchronization movement amount $D_{S2}$ in the next partition period.

Furthermore, in the present embodiment, the synchronization start position of the driven shaft is determined by a comparison of the amount of movement for synchronization which simply involves comparing the synchronization movement amount $D_{S2}$ in the next partition period with the synchronization movement amount $D_{S1}$ of the driven shaft at the current position of the drive shaft, but it is also possible to select, as the object for comparison, the predicted command movement amount in the next computation period, the predicted command movement amount in each of a plurality of subsequent computation periods from the next period on, or the predicted command movement amount in each of a plurality of subsequent computation periods during one revolution of the drive shaft, from the next period, and to start synchronization when it is determined that the synchronization movement amount $D_{S1}$ of the driven shaft at the current position of the drive shaft is smallest among these.

An example of this is now described on the basis of FIG. 2. In the example in FIG. 2, when comparing the predicted command movement amount in each of the two subsequent computation periods from the next period on, if the current phase of the drive shaft is n (partition 1 (D1)), then the amount of movement for synchronizing the driven shaft, which is waiting at the standby position $P_W$, with the drive shaft, is (B−A). Here, the amount of movement for synchronizing the driven shaft with the drive shaft in the next phase n+1 of the drive shaft in partition 2 (D2) is (C−A). Furthermore, the amount of movement for synchronizing the driven shaft with the drive shaft in the after-next phase n+2 of the drive shaft in partition 3 (D3) is (D−A). Here, when the amounts of movement B−A, C−A and D−A are compared, the amount of movement D−A is smallest while the amount of movement B−A is not smallest, and therefore, synchronization of the driven shaft is deferred in partition 1 (D1), and the driven shaft keeps a standby state. A similar procedure is repeated thereafter, and synchronization is started when the amount of movement at the current position is the smallest.

Second Embodiment

In the first embodiment, the synchronization start position is determined by comparing the amounts of movement for synchronizing the driven shaft with the drive shaft, but it is also possible to start synchronization when the speed for synchronization at the current point is smallest, by comparing the speed for synchronization at the current point and the speed for synchronization at a point after the current point.

Figure 4:
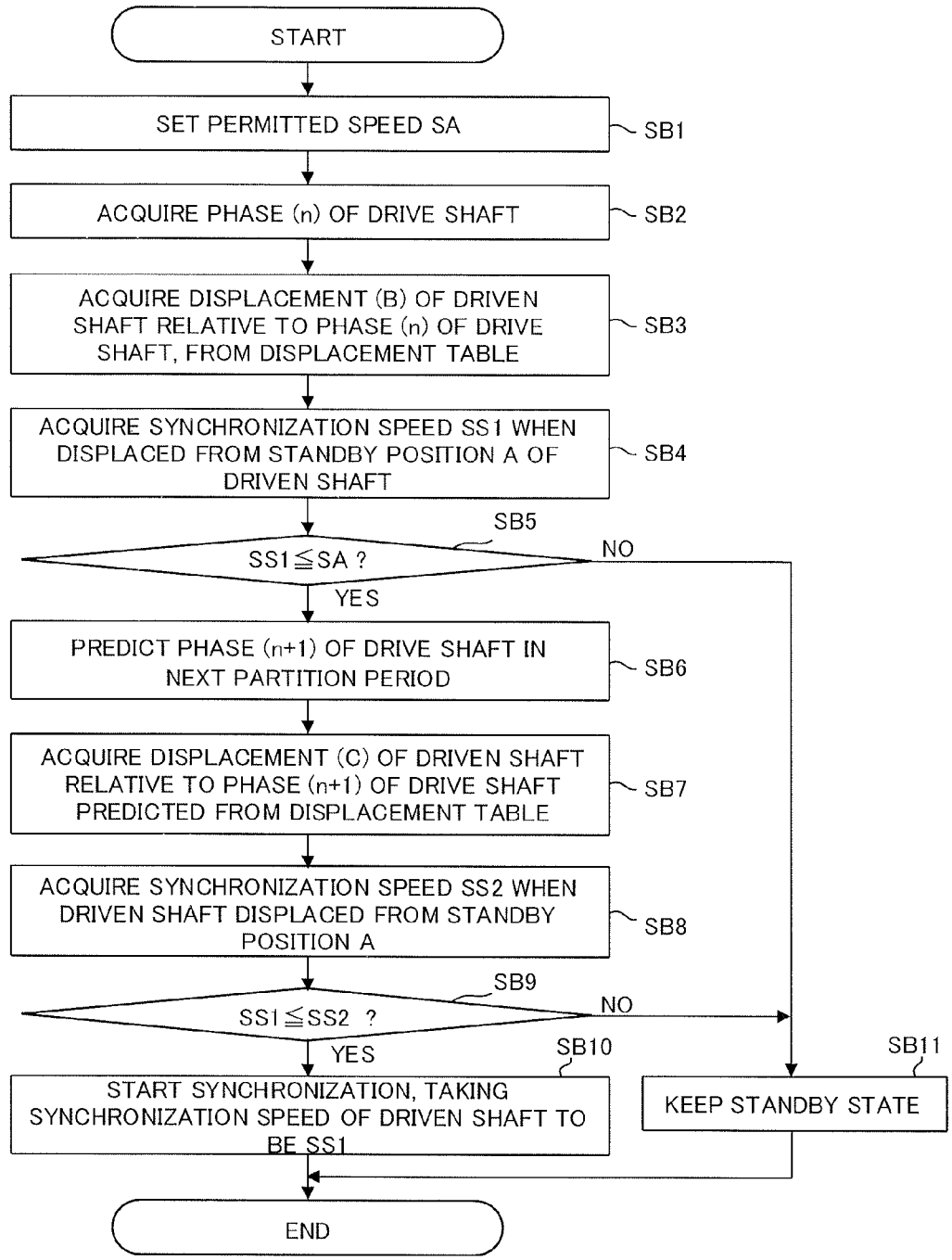
FIG. 4 is a flowchart showing a flow of the determination of the synchronization position of the driven shaft, and the synchronization operation, according to a second embodiment.

FIG. 4 is a flowchart showing a flow of the determination of the synchronization position of the driven shaft, and the synchronization operation, according to the present embodiment. This flow is described below, step by step.

(Step SB1) The permitted movement speed $S_A$ of the driven shaft is set.

(Step SB2) The phase (n) of the drive shaft at the current position of the drive shaft is acquired.

(Step SB3) The displacement (B) of the driven shaft relative to the phase (n) of the drive shaft is acquired on the basis of the displacement table.

(Step SB4) The synchronization speed $S_{S1}$ from the standby position A of the driven shaft is acquired.

(Step SB5) It is determined whether or not the synchronization speed $S_{S1}$ is equal to or lower than the permitted movement speed $S_A$.

If the synchronization speed $S_{S1}$ is equal to or lower than the permitted movement speed $S_A$ (YES), then the procedure advances to step SB6, whereas if the synchronization speed $S_{S1}$ is greater than the permitted movement speed $S_A$ (NO), then the procedure advances to step SB11.

(Step SB6) The phase (n+1) of the drive shaft in the next partition period is predicted.

(Step SB7) The displacement (C) of the driven shaft relative to the phase (n+1) of the drive shaft is acquired on the basis of the displacement table.

(Step SB8) The synchronization speed $S_{S2}$ from the standby position A of the driven shaft is acquired.

(Step SB9) It is determined whether or not the synchronization speed $S_{S1}$ is equal to or lower than the synchronization speed $S_{S2}$.

If the synchronization speed $S_{S1}$ is equal to or lower than the synchronization speed $S_{S2}$ (YES), then the procedure advances to step SB10, whereas if the synchronization speed $S_{S1}$ is greater than the synchronization speed $S_{S2}$ (NO), then the procedure advances to step SB11.

(Step SB10) Synchronization is started, taking the synchronization speed of the driven shaft to be $S_{S1}$.

(Step SB11) The standby state is kept.

Third Embodiment

In the first embodiment, the synchronization start position is determined by comparing the amounts of movement for synchronizing the driven shaft with the drive shaft, but in the present embodiment, the synchronization start position is determined by also taking account of the direction of movement, in addition to comparing the amounts of movement. This is described below on the basis of FIG. 5.

Figure 5:
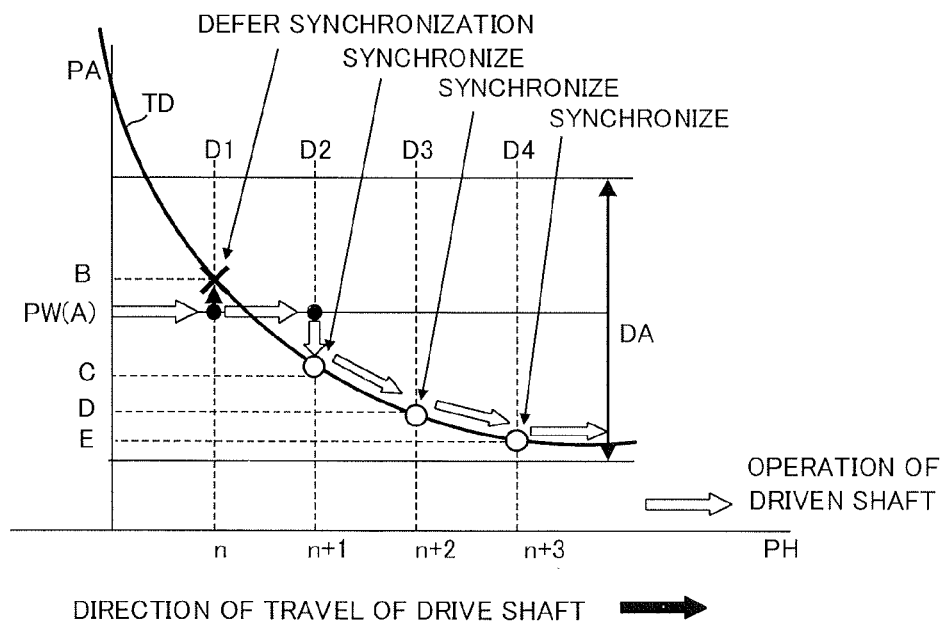
FIG. 5 is a diagram showing a state of synchronization of a driven shaft in a third embodiment.

FIG. 5 is a diagram showing a state of synchronization of a driven shaft in the synchronization control device according to the present embodiment. In the present embodiment, the drive shaft moves in the same direction at a uniform speed. D1 to D4 are partitions of the control device (partition 1 to partition 4), and the differential with respect to the driven shaft which is waiting at the standby position $P_W$, in each of partition 1 (D1), partition 2 (D2), partition 3 (D3) and partition 4 (D4) is taken to be equal to or less than the permitted movement amount $D_A$. In this case, the phase of the drive shaft in partition 1 (D1), partition 2 (D2), partition 3 (D3) and partition 4 (D4) is respectively called n, n+1, n+2, n+3, and the displacement of the driven shaft based on the displacement table at each of the phases is respectively called B, C, D and E.

The values of the displacement of the driven shaft in each of the phases are compared. When the current phase of the drive shaft is n (partition 1 (D1)), then the amount of movement for synchronizing the driven shaft, which is waiting at the standby position $P_W$, with the drive shaft, is (B-A). Next, a predicted amount of movement is predicted in the phases of the drive shaft from the current phase of the drive shaft on. In the present embodiment, when the current phase of the drive shaft is n (partition 1 (D1)), then the amount of movement for synchronizing the driven shaft with the drive shaft, in the next phase n+1 of the drive shaft in the next partition 2 (D2), is predicted. The amount of movement in partition 2 (D2) according to the present embodiment is (C-A). Here, when the amounts of movement B-A and C-A are compared, the amount of movement B-A is shorter. However, in phase n+1 of the drive shaft in the next partition 2 (D2), the direction of movement of the shaft for synchronizing the driven shaft is the reverse of partition 1 (D1), and therefore synchronization of the driven shaft is deferred in partition 1 (D1), and the driven shaft keeps a standby state.

Next, the situation when the phase of the drive shaft becomes n+1 (partition 2 (D2)) is considered. In this case, the amount of movement for synchronizing the driven shaft which is waiting at the standby position $P_W$, with the drive shaft, is (C-A). The amount of movement for synchronizing the driven shaft with the drive shaft in the next phase n+2 of the drive shaft in partition 3 (D3) is predicted. The amount of movement in partition 3 (D3) according to the present embodiment is (D-A). Here, when the amounts of movement C-A and D-A are compared, the amount of movement C-A is shorter. Furthermore, in partition 2 (D2) and partition 3 (D3), the direction of movement of the shaft in order to synchronize the driven shaft is the same, and therefore positioning of the driven shaft and synchronization thereof with the drive shaft is performed in partition 2 (D2).

In other words, the amount of movement of the cam in each partition is:

$$|B-A| \leq |C-A| \leq |D-A|$$

$$(B-A) \times (C-A) \leq 0$$

$$(C-A) \times (D-A) \geq 0$$

and therefore synchronization is started in partition 2.

In partition 3 (D3) and partition 4 (D4), since the driven shaft has been synchronized with the drive shaft in partition 2 (D2), then the synchronization is continued and the driven shaft is positioned towards displacement D and displacement E.

In this way, the synchronization position of the driven shaft is determined, and an actual synchronization operation is carried out, on the basis of the displacement table.

Figure 6:
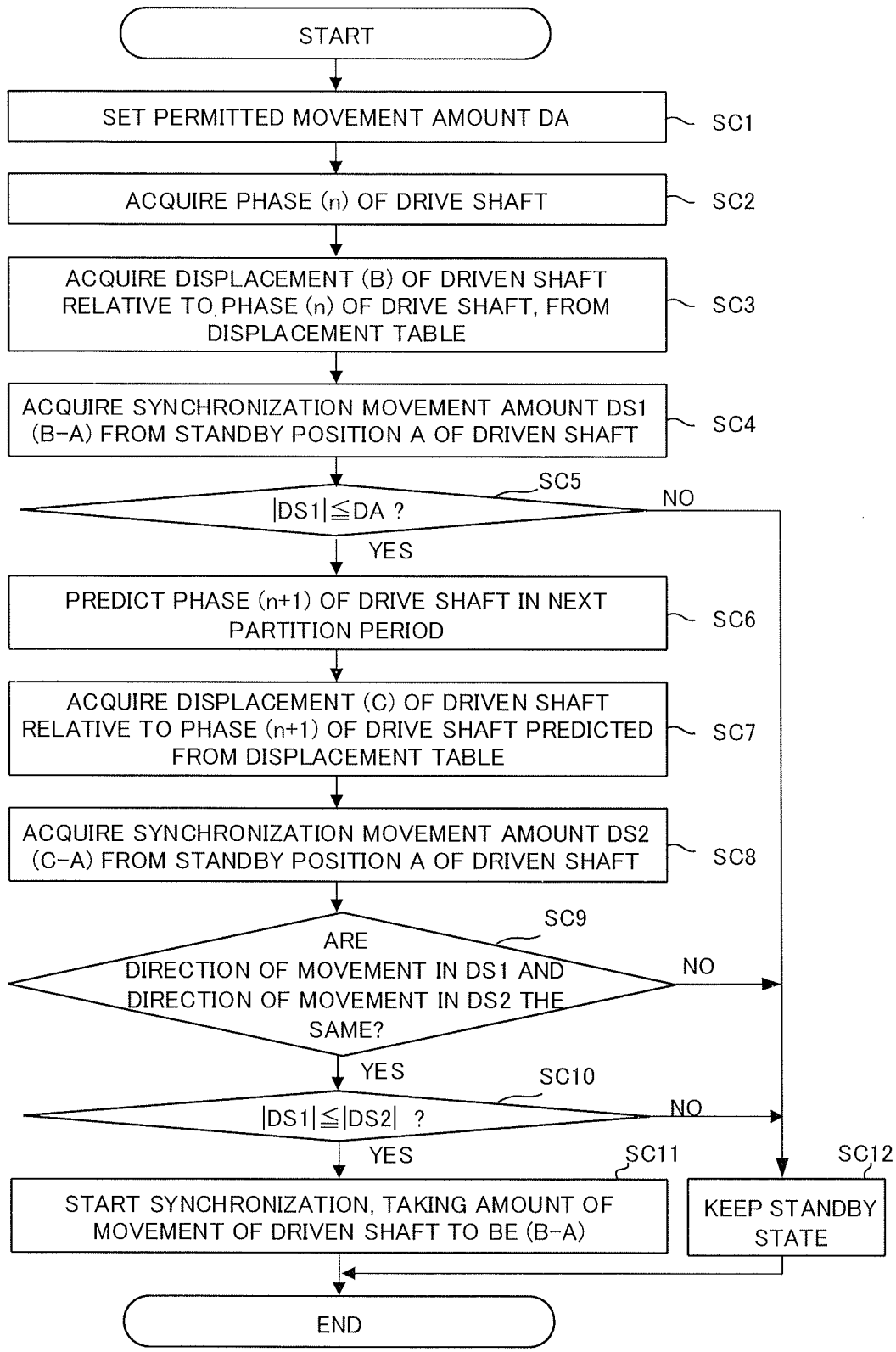
FIG. 6 is a flowchart showing a flow of the determination of the synchronization position of the driven shaft, and the synchronization operation, according to the third embodiment.

FIG. 6 is a flowchart showing a flow of the determination of the synchronization position of the driven shaft, and the synchronization operation, according to the present embodiment. This flow is described below, step by step.

(Step SC1) The permitted movement amount $D_A$ of the driven shaft is set.

(Step SC2) The phase (n) of the drive shaft at the current position of the drive shaft is acquired.

(Step SC3) The displacement (B) of the driven shaft relative to the phase (n) of the drive shaft is acquired on the basis of the displacement table.

(Step SC4) The synchronization movement amount $D_{S1}$ (B-A) from the standby position A of the driven shaft is acquired.

(Step SC5) It is determined whether or not the absolute value of the synchronization movement amount $D_{S1}$ is equal to or less than the permitted movement amount $D_A$. If the absolute value of the synchronization movement amount $D_{S1}$ is equal to or less than the permitted movement amount $D_A$ (YES), then the procedure advances to step SC6, whereas if the absolute value of the synchronization movement amount $D_{S1}$ is greater than the permitted movement amount $D_A$ (NO), then the procedure advances to step SC12.

(Step SC6) The phase (n+1) of the drive shaft in the next partition period is predicted.

(Step SC7) The displacement (C) of the driven shaft relative to the phase (n+1) of the drive shaft is acquired on the basis of the displacement table.

(Step SC8) The synchronization movement amount $D_{S2}$ (C-A) from the standby position A of the driven shaft is acquired.

(Step SC9) It is determined whether or not the direction of movement according to the synchronization movement amount $D_{S1}$ and the direction of movement according to the synchronization movement amount $D_{S2}$ are the same. If the directions are the same (YES), then the procedure advances to step SC10, and if the directions are not the same (NO), then the procedure advances to step SC12.

(Step SC10) It is determined whether or not the absolute value of the synchronization movement amount $D_{S1}$ is equal to or less than the absolute value of the synchronization movement amount $D_{S2}$. If the absolute value of the synchronization movement amount $D_{S1}$ is equal to or less than the absolute value of the synchronization movement amount $D_{S2}$ (YES), then the procedure advances to step SC11, whereas if the absolute value of the synchronization movement amount $D_{S1}$ is greater than the absolute value of the synchronization movement amount $D_{S2}$ (NO), then the procedure advances to step SC12.

(Step SC11) Synchronization is started, taking the amount of movement of the driven shaft to be (B-A).

(Step SC12) The standby state is kept.

In the present embodiment, before comparing the synchronization movement amount $D_{S1}$ of the driven shaft at the current position of the drive shaft with the synchronization movement amount $D_{S2}$ in the next partition period, the synchronization movement amount $D_{S1}$ is compared with the permitted movement amount $D_A$, but in cases where the driven shaft does not perform considerable displacement, for instance, the comparison of the synchronization movement amount $D_{S1}$ and the permitted movement amount $D_A$ is omitted, and the synchronization start position of the driven shaft can be determined simply by comparing the synchronization movement amount $D_{S1}$ of the driven shaft at the current position of the drive shaft with the synchronization movement amount $D_{S2}$ in the next partition period.

Furthermore, in the present embodiment, the synchronization start position of the driven shaft is determined by a comparison of the amount of movement for synchronization which simply involves comparing the synchronization movement amount $D_{S2}$ in the next partition period with the synchronization movement amount $D_{S1}$ of the driven shaft at the current position of the drive shaft, but it is also possible to select, as the object for comparison, the predicted command movement amount in the next computation period, the predicted command movement amount in each of a plurality of subsequent computation periods from the next period on, or the predicted command movement amount in each of a plurality of subsequent computation periods during one revolution of the drive shaft, from the next period, and to start synchronization when it is determined that the synchronization movement amount $D_{S1}$ of the driven shaft at the current position of the drive shaft is smallest among the amounts of movement where the direction of movement according to the synchronization movement amount $D_{S1}$ of the driven shaft at the current position of the drive shaft is the same as the direction of movement based on the predicted command movement amount in each of the plurality of computation periods.

Fourth Embodiment

In the third embodiment, the synchronization start position is determined by comparing the amount of movement for synchronizing the driven shaft with the drive shaft, but it is also possible to start synchronization when the speed for synchronization at the current point is smallest, by comparing the speed for synchronization at the current point and the speed for synchronization at a point after the current point.

Figure 7:
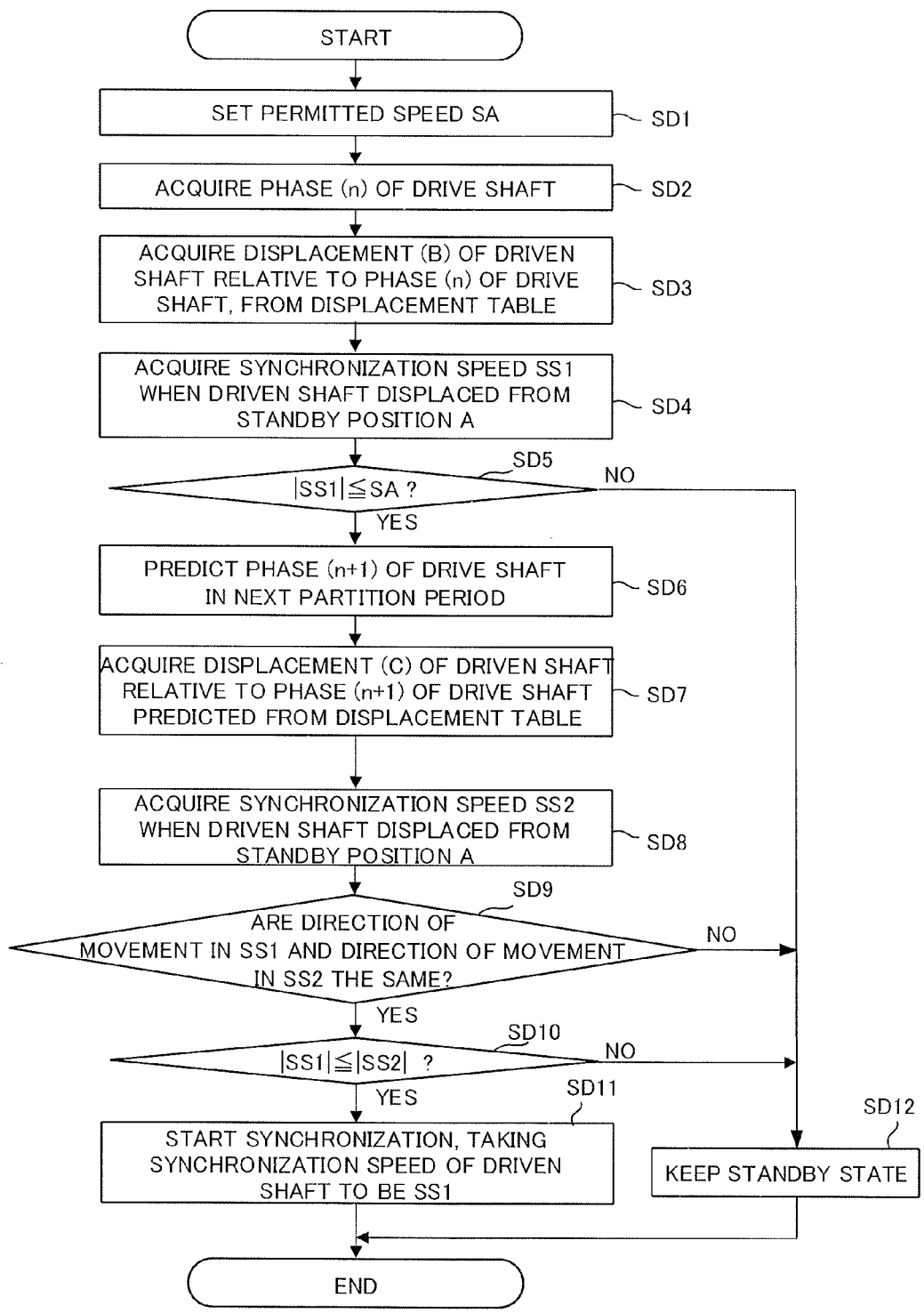
FIG. 7 is a flowchart showing a flow of the determination of the synchronization position of the driven shaft, and the synchronization operation, according to a fourth embodiment.
Figure 8:
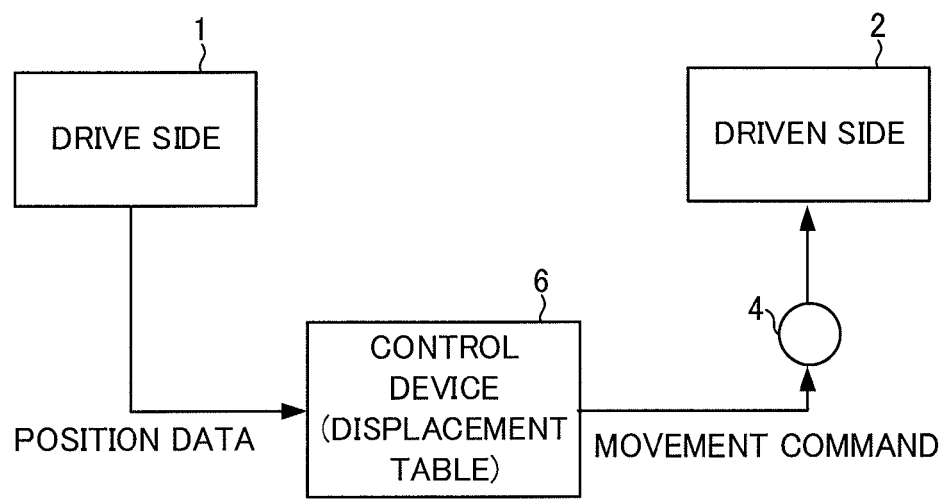
FIG. 8 is a general schematic drawing for illustrating synchronization control according to the prior art.

FIG. 7 is a flowchart showing a flow of the determination of the synchronization position of the driven shaft, and the synchronization operation, according to the present embodiment. This flow is described below, step by step.

(Step SD1) The permitted movement speed $S_A$ of the driven shaft is set.
(Step SD2) The phase (n) of the drive shaft at the current position of the drive shaft is acquired.
(Step SD3) The displacement (B) of the driven shaft relative to the phase (n) of the drive shaft is acquired on the basis of the displacement table.
(Step SD4) The synchronization speed $S_{S1}$ from the standby position A of the driven shaft is acquired.
(Step SD5) It is determined whether or not the absolute value of the synchronization speed $S_{S1}$ is equal to or lower than the permitted movement speed $S_A$.

If the absolute value of the synchronization speed $S_{S1}$ is equal to or lower than the permitted movement speed $S_A$ (YES), then the procedure advances to step SD6, whereas if the absolute value of the synchronization speed $S_{S1}$ is greater than the permitted movement speed $S_A$ (NO), then the procedure advances to step SD12.

(Step SD6) The phase (n+1) of the drive shaft in the next partition period is predicted.
(Step SD7) The displacement (C) of the driven shaft relative to the phase (n+1) of the drive shaft is acquired on the basis of the displacement table.
(Step SD8) The synchronization speed $S_{S2}$ from the standby position A of the driven shaft is acquired.
(Step SD9) It is determined whether or not the direction of movement according to the synchronization speed $S_{S1}$ and the direction of movement according to the synchronization speed $S_{S2}$ are the same. If the directions are the same (YES), then the procedure advances to step SD10, and if the directions are not the same (NO), then the procedure advances to step SD12.
(Step SD10) It is determined whether or not the absolute value of the synchronization speed $S_{S1}$ is equal to or lower than the absolute value of the synchronization speed $S_{S2}$. If the absolute value of the synchronization speed $S_{S1}$ is equal to or lower than the absolute value of the synchronization speed $S_{S2}$ (YES), then the procedure advances to step SD11, whereas if the absolute value of the synchronization speed $S_{S1}$ is greater than the absolute value of the synchronization speed $S_{S2}$ (NO), then the procedure advances to step SD12.
(Step SD11) Synchronization is started taking the synchronization speed of the driven shaft to be $S_{S1}$.
(Step SD12) The standby state is kept.

What is claimed is:

1. A synchronization control device configured to previously register a displacement table, in which displacement of a driven shaft is associated with respective phases of a drive shaft, and determine a displacement of the driven shaft with respect to the phase of the drive shaft and position the driven shaft on the basis of the displacement table,
the synchronization control device comprising:
a command movement amount calculation unit for calculating a command movement amount, which is an amount of movement of the driven shaft to a synchronization position, relative to a current phase of the drive shaft, on the basis of the displacement table;
a predicted command movement amount calculation unit for calculating a predicted command movement amount, which is an amount of movement of the driven shaft to a synchronization position, relative to the phase of the drive shaft after the current phase, on the basis of the displacement table; and
a movement amount comparison unit for comparing the command movement amount with the predicted command movement amount, wherein
synchronization of the driven shaft is not started when the comparison result from the movement amount comparison unit indicates that the predicted command movement amount is less than the command movement amount, and synchronization is started when the predicted command movement amount is equal to or greater than the command movement amount.

2. The synchronization control device according to claim 1, wherein
a permitted movement amount is set; and
synchronization is started when the command movement amount is equal to or less than the permitted movement amount, and the predicted command movement amount is equal to or greater than the command movement amount.

3. The synchronization control device according to claim 2, wherein
the predicted command movement amount calculated by the predicted command movement amount calculation unit is configured to be selected from any of a predicted command movement amount in a next computation period, a predicted command movement amount in each of a plurality of subsequent computation periods from the next period on, and a predicted command movement amount in each of a plurality of subsequent computation periods during the time of one revolution of the drive shaft, from the next period; and the movement amount comparison unit is configured to compare the selected predicted command movement amount and the command movement amount and starts synchronization when the command movement amount is smallest.

4. The synchronization control device according to claim 2, wherein a synchronization operation is started when a direction of movement based on the command movement amount calculated by the command movement amount calculation unit and a direction of movement based on the predicted command movement amount calculated by the predicted command movement amount calculation unit are the same, and the predicted command movement amount is equal to or greater than the command movement amount.

5. The synchronization control device according to claim 1, wherein
the predicted command movement amount calculated by the predicted command movement amount calculation unit is configured to be selected from any of a predicted command movement amount in a next computation period, a predicted command movement amount in each of a plurality of subsequent computation periods from the next period on, and a predicted command movement amount in each of a plurality of subsequent computation periods during the time of one revolution of the drive shaft, from the next period; and
the movement amount comparison unit is configured to compare the selected predicted command movement amount and the command movement amount and starts synchronization when the command movement amount is smallest.

6. The synchronization control device according to claim 5, wherein a synchronization operation is started when a direction of movement based on the command movement amount calculated by the command movement amount calculation unit and a direction of movement based on the predicted command movement amount calculated by the predicted command movement amount calculation unit are the same, and the predicted command movement amount is equal to or greater than the command movement amount.

7. The synchronization control device according to claim 1, wherein a synchronization operation is started when a direction of movement based on the command movement amount calculated by the command movement amount calculation unit and a direction of movement based on the predicted command movement amount calculated by the predicted command movement amount calculation unit are the same, and the predicted command movement amount is equal to or greater than the command movement amount.

8. A synchronization control device configured to previously register a displacement table, in which displacement of a driven shaft is associated with respective phases of a drive shaft, and determine a displacement of the driven shaft with respect to the phase of the drive shaft and position the driven shaft on the basis of the displacement table,
the synchronization control device comprising:
a command speed calculation unit for calculating a command speed, which is a speed of movement of the driven shaft to a synchronization position, relative to the current phase of the drive shaft, on the basis of the displacement table;
a predicted command speed calculation unit for calculating a predicted command speed, which is a speed of movement of the driven shaft to a synchronization position, relative to the phase of the drive shaft after the current phase, on the basis of the displacement table; and a speed comparison unit for comparing the command speed with the predicted command speed, wherein
synchronization of the driven shaft is not started when the comparison result from the speed comparison unit indicates that the predicted command speed is less than the command speed, and synchronization is started when the predicted command speed is equal to or greater than the command speed.

9. The synchronization control device according to claim 8, wherein
a permitted movement speed is set; and
synchronization is started when the command speed is equal to or lower than the permitted movement speed, and the predicted command speed is equal to or greater than the command speed.

10. The synchronization control device according to claim 9, wherein
the predicted command speed calculated by the predicted command speed calculation unit is configured to be selected from any of a predicted command speed in a next computation period, a predicted command speed in each of a plurality of subsequent computation periods from the next period on, and a predicted command speed in each of a plurality of subsequent computation periods during the time of one revolution of the drive shaft, from the next period; and
the speed comparison unit compares the selected predicted command speed and the command speed and starts synchronization when the command speed is smallest.

11. The synchronization control device according to claim 9, wherein a synchronization operation is started when a direction of movement based on the command speed calculated by the command speed calculation unit and a direction of movement based on the predicted command speed calculated by the predicted command speed calculation unit are the same, and the predicted command speed is equal to or greater than the command speed.

12. The synchronization control device according to claim 8, wherein
the predicted command speed calculated by the predicted command speed calculation unit is configured to be selected from any of a predicted command speed in a next computation period, a predicted command speed in each of a plurality of subsequent computation periods from the next period on, and a predicted command speed in each of a plurality of subsequent computation periods during the time of one revolution of the drive shaft, from the next period; and
the speed comparison unit compares the selected predicted command speed and the command speed and starts synchronization when the command speed is smallest.

13. The synchronization control device according to claim 12, wherein a synchronization operation is started when a direction of movement based on the command speed calculated by the command speed calculation unit and a direction of movement based on the predicted command speed calculated by the predicted command speed calculation unit are the same, and the predicted command speed is equal to or greater than the command speed.

14. The synchronization control device according to claim 8, wherein a synchronization operation is started when a direction of movement based on the command speed calculated by the command speed calculation unit and a direction of movement based on the predicted command speed calculated by the predicted command speed calculation unit are the same, and the predicted command speed is equal to or greater than the command speed.

* * * * *